United States Patent [19]

Bowker et al.

[11] Patent Number: 4,797,915
[45] Date of Patent: Jan. 10, 1989

[54] COMMUNICATION SYSTEM HAVING AUTOMATIC CALL ROUTE SELECTION

[75] Inventors: Duane O. Bowker, Neptune City; Adrian A. Giuliani, Aberdeen; David F. Jones, Middletown, all of N.J.

[73] Assignees: American Telephone and Telegraph Company, New York, N.Y.; AT&T Information Systems Inc., Morristown, N.J.

[21] Appl. No.: 917,202

[22] Filed: Oct. 9, 1986

[51] Int. Cl.[4] .......................................... H04M 3/42
[52] U.S. Cl. .................................. 379/216; 379/273; 379/234; 379/165
[58] Field of Search ............... 379/165, 166, 273, 274, 379/157, 156, 280, 282, 284, 244, 221

[56] References Cited

U.S. PATENT DOCUMENTS

| | | | |
|---|---|---|---|
| 3,935,396 | 1/1976 | Barsellotti | 379/165 |
| 4,096,359 | 6/1978 | Barsellotti | 379/166 |
| 4,503,291 | 3/1985 | von Holten et al. | 379/355 |
| 4,506,346 | 3/1985 | Bennett et al. | 379/166 |

Primary Examiner—James L. Dwyer
Attorney, Agent, or Firm—John A. Caccuro

[57] ABSTRACT

An automatic route selection capability for a communication system is described which enables the system to utilize digits of a called party number to select in a predetermined manner a predefined group of line pools and a line therein over which the call is to be placed. Once the predefined group of line pools is selected, a priority scheme enables the system to sequentially search each line pool for an available line over which the call can be placed. The system dials the called party using route character digits which prefix or optionally replace one or more of the user-dialed digits.

15 Claims, 6 Drawing Sheets

COMMUNICATION SYSTEM HAVING AUTOMATIC CALL ROUTE SELECTION

TECHNICAL FIELD

This invention relates to telephone communication systems and, more particularly, to an automatic call routing capability for such a system.

BACKGROUND OF THE INVENTION

In key and PBX telephone systems, groups of users having a commonality of work functions may be assigned to use two or more dedicated pools of telephone lines (i.e., line groups). These line pools enable the system to provide a particular call capability—such as call restriction, grouping incoming calls, WATS service, etc.—to all users in that pool. Disadvantageously, however, when a user wants to make an external party call, he or she must first dial the pool access codes and then dial the outside party's line. This extra dialing of the pool access code is time-consuming and requires that the user remember his or her code.

SUMMARY OF THE INVENTION

According to the present invention, a communication system is connected to a plurality of communication lines arranged in a plurality of line groups. Each station set connected to the system is assigned to use two or more of the line groups. When a call is placed from a station, a line is selected for the call from an assigned line group using the called party dialing signal received from the calling station. In one embodiment, based on the first three digits of the number being dialed by the user, the system uses a predetermined selection scheme to select a non-busy line group from among the plurality of pools in the system and thereafter enables the dialed number to be outputted on a non-busy line in the selected pool. In another embodiment, based on the first six digits of the number being dialed by the user, the route selection algorithm can be optioned to select specific area code and exchange code combinations. In the above embodiments, three-digit and six-digit selection schemes can be used concurrently. Additionally, these embodiments can be used to select an empty line group to screen specific dialing patterns for restriction services. According to another aspect of the present invention, part of the dialed number may be deleted or optionally substituted therefor. Additionally, the system outputs an audible feedback tone to the user after the registration of each user-dialed digit.

BRIEF DESCRIPTION OF THE DRAWING

The characteristics and operation of the present invention will be more apparent from the following detailed description taken in conjunction with the drawings in which.

GENERAL DESCRIPTION

In the following description, each element of each figure has a reference designation associated therewith, the first number of which refers to the figure in which that element is located (e.g., 100 is located in FIG. 1).

Figure 1:
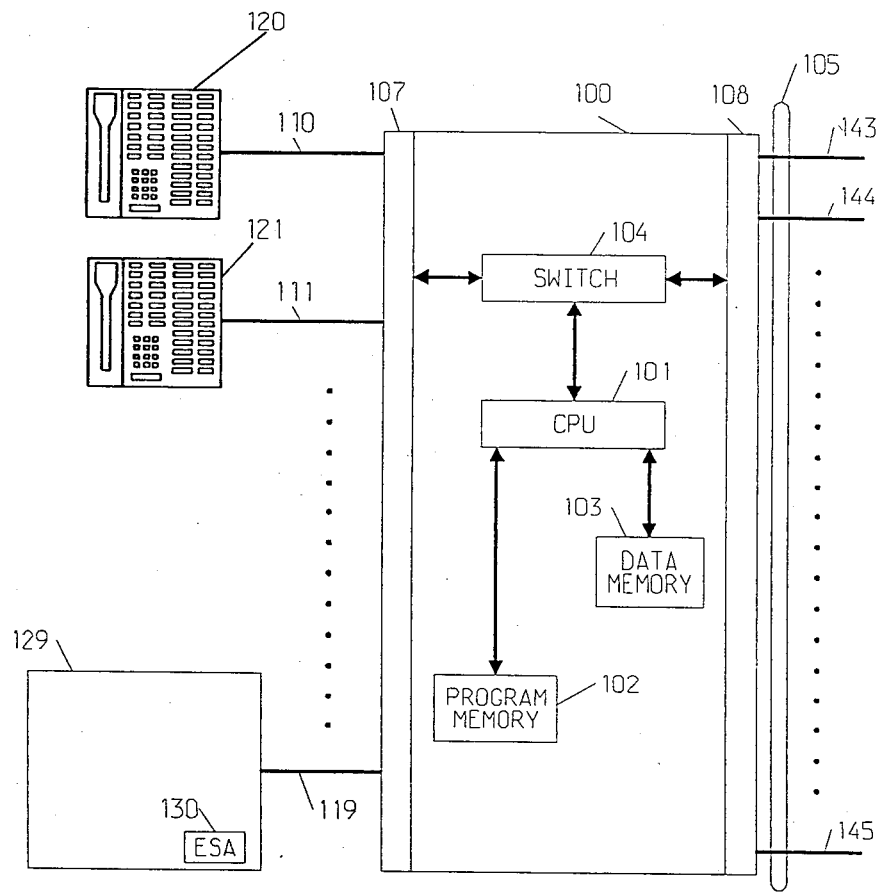
FIG. 1 is a block diagram of a telephone communication system useful for describing the present invention.

Shown in FIG. 1 is an illustrative block diagram of a communication system useful for describing the operation of the present invention. The system includes common control module or unit 100 which connects to one or more central office (CO) or PBX lines 105 via interface 108 and which connects via interface 107 and loops 110–119 to two or more stations sets, such as 120–129.

The general operation of the communication system shown in FIG. 1 is as follows. Control unit 100 establishes and controls all intercom and CO or PBX line communications. Control unit 100 includes switch 104, central processor unit (CPU) 101, program memory 102 and data memory 103. Program memory 102 provides instructions to CPU 101 for controlling switch 104 and interface units 107 and 108 to enable the various operating features and functions of the system. Data memory 103 is utilized by CPU 101 for storing and accessing data associated with performing the various functions and features programmed in program memory 102. In a preferred embodiment, CPU 101 is a microprocessor; program memory 102 is read-only memory (ROM); and data memory 103 is random access memory (RAM). The interface circuits 107 and 108 may include well-known circuitry such as a ring detector, switching matrix, network control, line circuits, and other circuitry required by the system to establish, maintain and terminate communications. One communication system which may embody the present invention utilizes interchangeable program cartridges to supplement program memory 102 and data memory 103, and is described in U.S. Pat. No. 4,506,346 filed by Bennett et al and issued on Mar. 19, 1985, which description is incorporated by reference herein.

Figure 2:
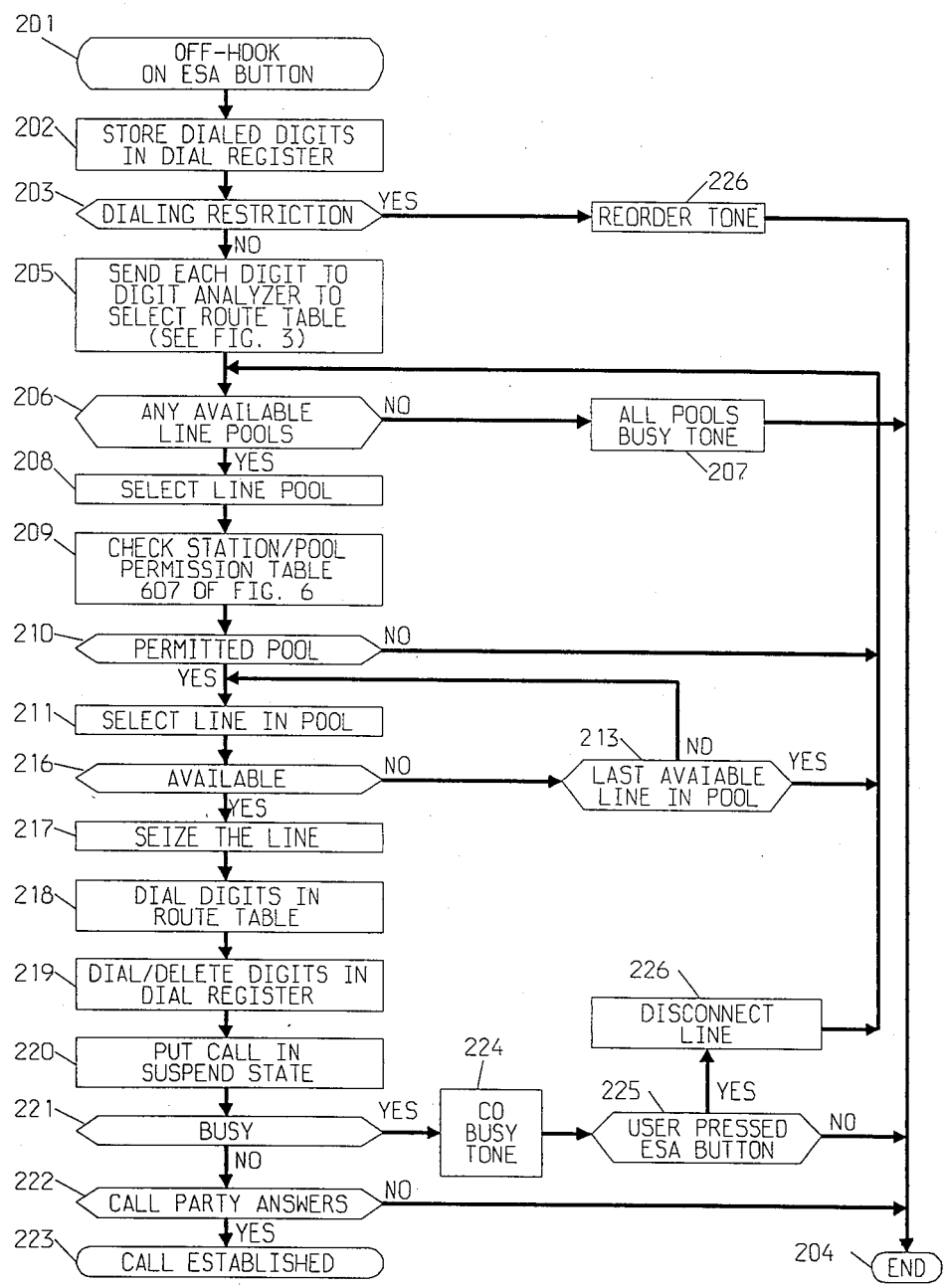
FIG. 2 shows a flow chart describing the overall operation of the present invention.
Figure 4:
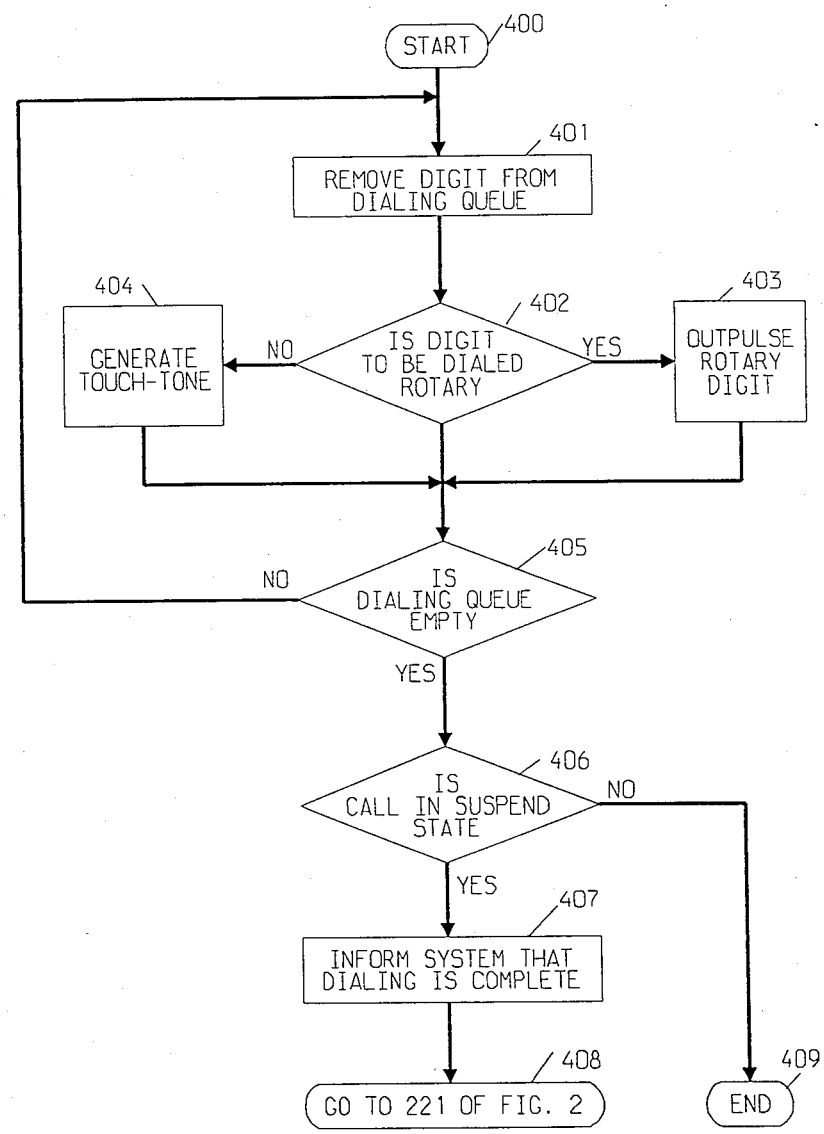
FIG. 4 shows a flow chart describing the dialing sequence.
Figure 5:
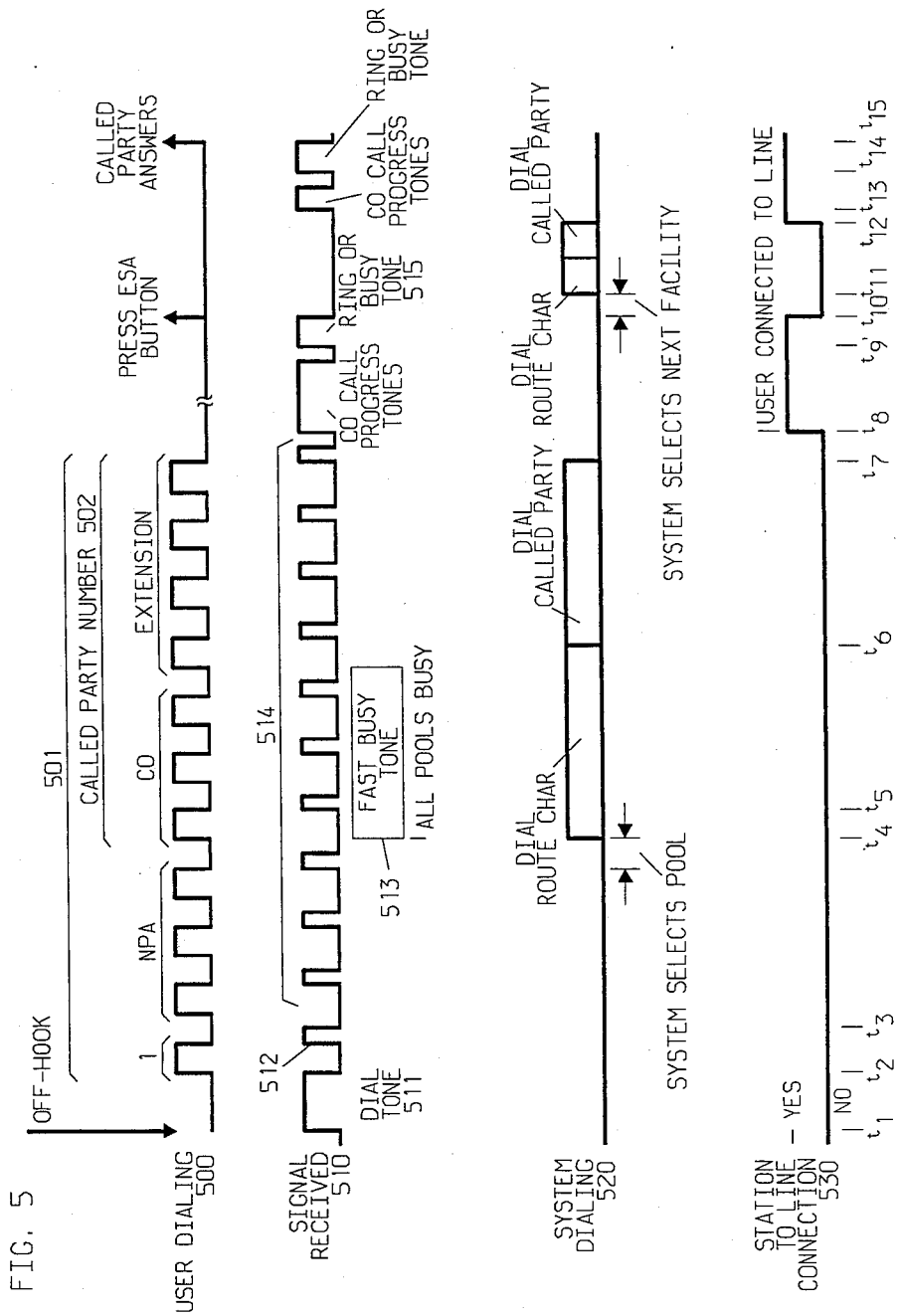
FIG. 5 illustrates the timing sequence of various signals of the system.

Before proceeding with the operating description of the present invention, it should be recognized that the present invention may be utilized in other telephone communication systems. Since such systems utilize a variety of hardware and programming techniques, no attempt is made to describe the program used to control the communication system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the block diagram of FIG. 1, the flow charts of FIGS. 2–4, timing signals of FIG. 5, and the tables of FIG. 6 to describe the logical steps and the various parameters required to implement the present invention.

GENERAL OPERATION

According to the present invention, an automatic route selection feature is provided for a communication system which enables a system administrator to designate the manner in which line pools—groups of central office (CO) lines—are selected for the placement of external calls. The route selected is based upon the called party digits dialed at a station or otherwise inputted to the system.

Figure 6:
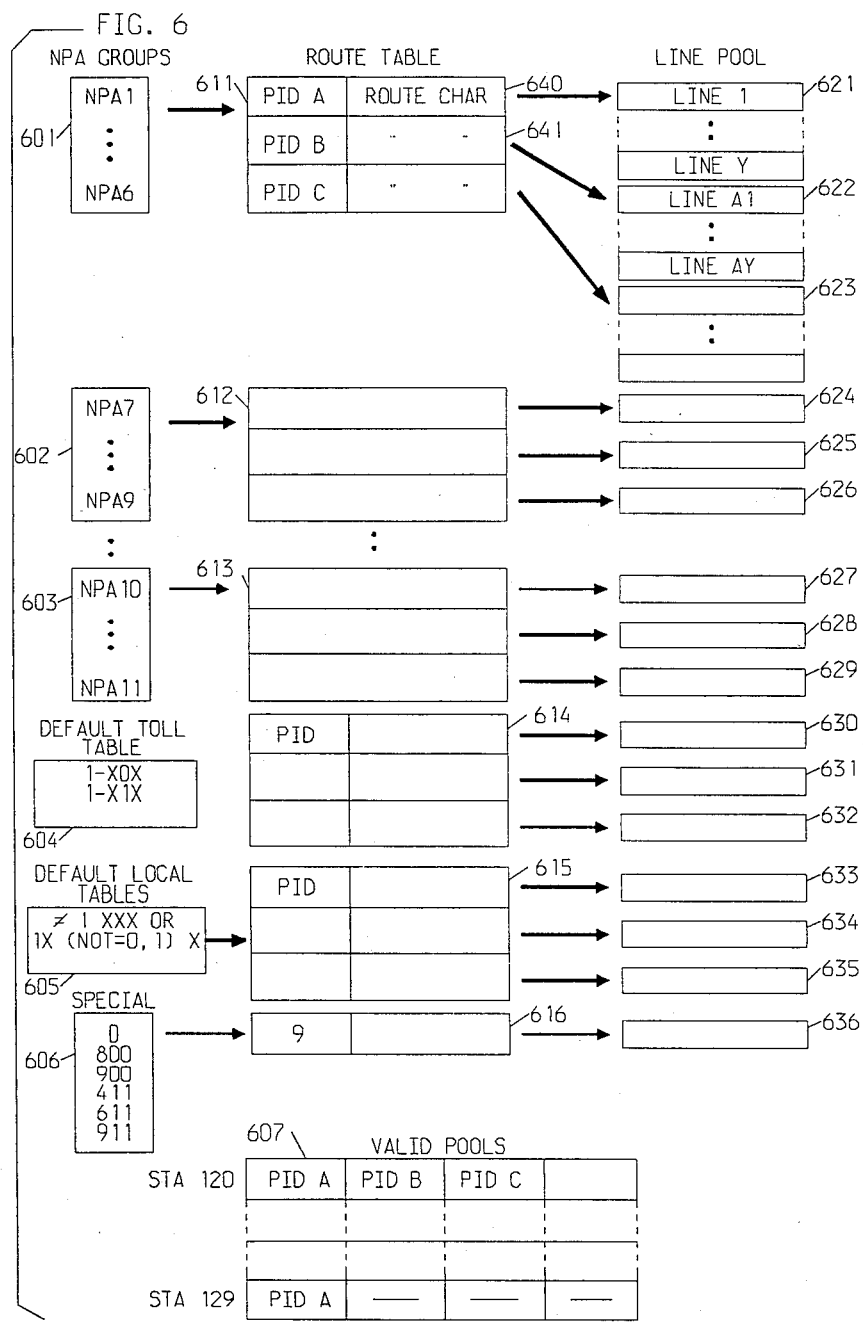
FIG. 6 illustrates the various route selection tables utilized by the present invention.

With reference to FIG. 6, the system administrator first establishes line pool tables (621 to 636, configured as shown by 621), route tables (611 to 616, configured as shown by 611), number plan area (NPA) code tables (601 to 603, configured as shown by 601) and other associated tables (i.e., 604, 605 and 606). Additionally, table 607 which defines which pools are to be made available to each station set is established by the administrator. It should be understood that according to the present invention the number of line groups, route tables, etc. can be varied according to the needs of the communication system. Once these tables are established, the system decodes the dialed called party digits and determines which NPA code table (601-603), default table (604, 605) or special table (606) and which associated route table (611-616) was selected. The line pool associated with the first route listed in the selected route table (611-616) is selected to be used for the external call. Thus, for example, if the user dials NPA 1 digits, NPA code table 601 is selected, causing the first route 640 of route table 611 to be selected as the route. The system checks in table 607 if the calling station set is permitted to use route 640. This is accomplished by checking if that station is permitted to use the pool identifier associated with route 640. If permitted, the system checks the line pool 621 associated with route 640 for an available line, e.g., line 1. If line 1 is busy, the system looks for another line in line pool 621. If all lines are busy in line pool 621, the system checks the next route 641 in table 611 and then checks if pool identifier PID B is located in table 607 for the calling station set. If the pool identifier is found in table 607, then it searches line pool 622 for an available line.

Each station set may optionally include an external system access button (ESA) which enables access to outside communication lines and which enables the automatic route selection (ARS) feature. Thus, a user goes off-hook on an ESA button and dials the desired number. Even though the call is placed on an ESA button, no pool access code need be dialed. Based on the number being dialed by the user, the system selects, based on a user-predetermined administration selection scheme, a non-busy line pool from among the plurality of pools in the system over which to dial the number.

In addition to selecting a pool over which to place the call, the system also dials any necessary access and account numbers, such as those needed to access Other Common Carriers (OCCs), before dialing the digits supplied by the user. These access and account numbers are stored in the route tables (e.g., 611 of FIG. 6). Appropriate audible feedback, as will be discussed later, is provided to the user.

The system also provides on-hook dialing using repertory numbers. When a user depresses a repertory dial button while on-hook at an ESA button, the station goes off-hook and a brief audible tone is provided followed by CO call progress tones. The dialing in this case is transparent to the user, which means that a single audible is given the user to confirm registration of a button depression but the user does not hear the dialing of the individual digits.

When all the lines of the selected line pool are busy or a nonanswering carrier is reached, a busy tone is outputted to the user and the user must depress the ESA button being used for the call to cause the system to attempt to route the call over the next route entry in the ARS table. No other user intervention is required for ARS to operate. Obviously, other types of signaling (e.g., switchhook flash, etc.) could be used to signal the system to select the next route entry. In an alternative embodiment, the system automatically selects the next route without user intervention.

DETAILED DESCRIPTION

The following description jointly references FIGS. 1,2,5 and 6. A user goes off-hook on an ESA button (e.g., 130 of station set 129), step 201, and dials the called party digits. (Note, when the user goes off-hook, he or she is connected to system 100 but not to any of the CO lines 143-145.) When the user goes off-hook at time t1 of FIG. 5, the user is given audible feedback in the form of an intercom dial tone, 511, during time t1-t2. This dial tone is broken at t2 when the first digit is dialed by the user. System CPU 101 stores the dialed digits (501) in a dial register during step 202. This occurs during the time t1-t7 of FIG. 5. Note, after each dialed digit in 501, a tone burst (e.g., 512 at t3 of FIG. 5) is outputted to the user.

The time between the last digit dialed by the user, t7, and the user being connected to the CO line, t8, may be many seconds. For example, a system 100 which uses rotary dialing may cause significant delays.

As will be discussed later, once the system completes dialing all the digits, the user is connected to a CO line and receives CO call progress tones at times t8 to t9. In the case where the system is unable to provide a non-busy pool, discussed later, the user gets a fast busy tone.

It should be noted that the ESA button function of enabling external communication line access could also be accomplished using an external access code digit, e.g., the digit 9. Obviously, the system would be programmed to recognize the digit 9 rather than an ESA button depression. Moreover, if no intercom-type calls but only external calls were possible with the system, no ESA button or dial 9 digit would be required. Additionally, on-hook dialing with repertory buttons may also be used to originate calls on ESA buttons when ARS is active. While on-hook at an ESA button, if a user depresses a repertory dial button, the station set goes off-hook and a brief dial tone signal 511 is provided to the user. Thereafter, a brief audible pulse (e.g., 512) is provided to the user after the repertory button is pressed. Thus, when a repertory dialing arrangement is used, there would be only one pulse 512 after the repertory button is pressed and pulses in group 514 would not exist. This brief audible pulse replaces the normal dialing signal feedback which normally occurs during the interval t1-t8. Following a short silent interval (t7-t8), the user hears CO call progress tones at t8.

Returning to FIG. 2, during step 203, the system checks whether the originating station is subject to any dialing restrictions. If the station is classified as restricted, then prior to its connection to a line, the user receives a reorder tone 226 (not shown, but occurring during time interval 514) and the sequence terminates, 204. If no dialing restriction exists, then each digit is analyzed and the system selects, step 205, a route table (e.g., 611) for the call.

Figure 3:
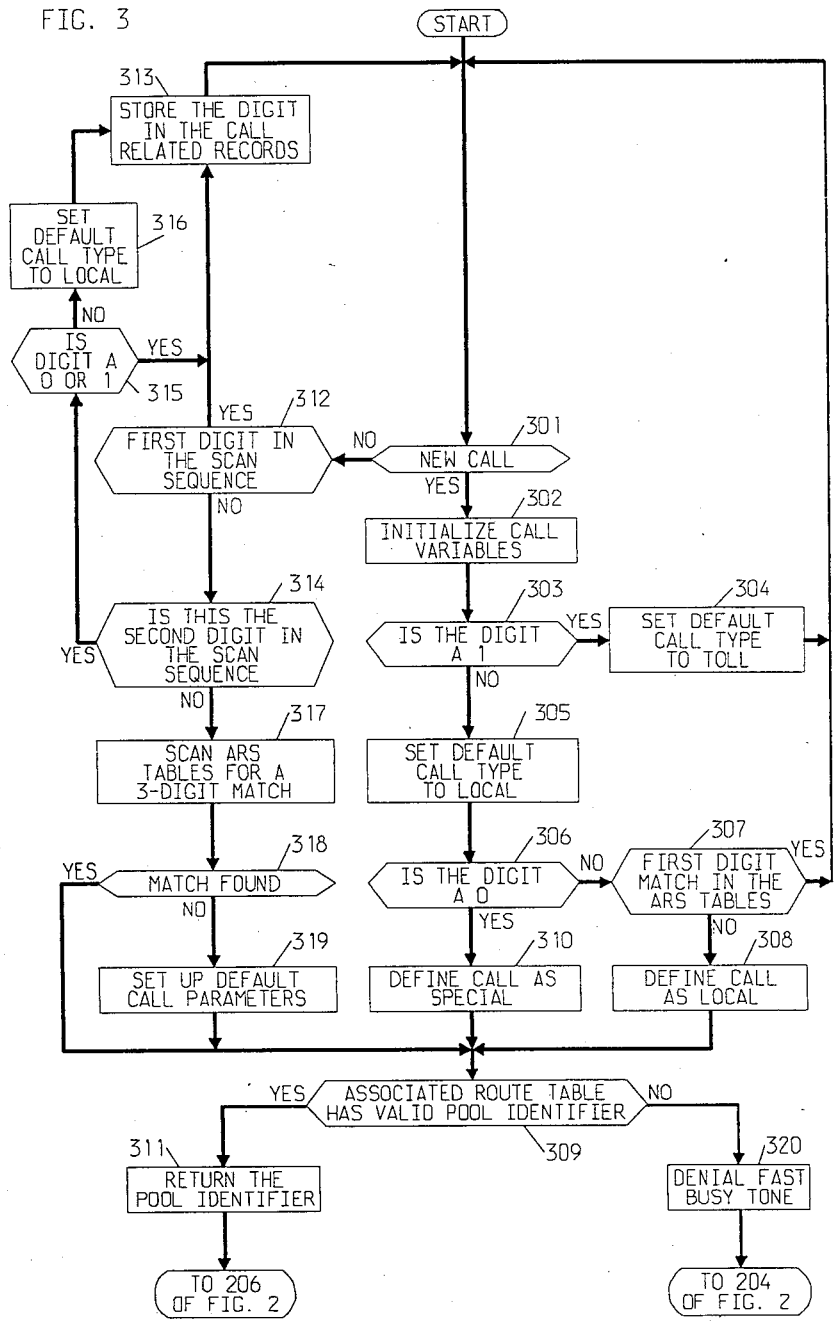
FIG. 3 shows a flow chart describing the digit decoding sequence which identifies call types.

The digit analyzer process used in the route table selection process is illustrated in FIG. 3 and will be described in later paragraphs. The route selection process results in the selection of one of the route tables (611-616 of FIG. 6). Each route table (e.g., 611) comprises a group of line pools. Each route table prioritizes the order in which line pools are selected when the user dials one of the NPA or central office exchange (NNX) codes of code table 601. That is, the connection is first attempted over the lines of pool PID A, then PID B, and finally PID C. Each of these line pools (e.g., 621) consists of a group of CO lines having a common characteristic. The line pools may, for example, include interstate wide area telephone service (WATS) lines, intrastate WATS lines, foreign exchanges (FX), local lines, etc. Moreover, each of these pools may differ because each uses a different common carrier. Thus, different interstate WATS line pools may exist for AT&T, MCI, or other common carrier lines.

In step 206, the system determines whether any line pool in the selected route table (e.g., PID A, PID B, PID C of 611) is available. If all line pools are busy, an all-pools-busy tone (e.g., 513 at t4 of FIG. 5) is outputted, 207, to the calling party and the operation is terminated.

Assuming line pool PID A is available, the system selects that pool, 208, and checks, 209, the pool access permission table 607 to determine, 210, whether this station has permission to use this pool. For example, as shown in table 607, station 120 can use pools PID A, PID B and PID C while station 129 can use pool PID A but cannot use pools PID B and PID C. If the calling station is not permitted to use the selected line pool, the system checks, 206, if there are any other available line pools; if not, an all-pools-busy audible signal is outputted, 207, and the operation is terminated, 204.

Assuming the station is permitted to use the selected pool, PID A, the system looks for an available (non-busy) line, 211 and 216, by checking lines 1 through Y of pool PID A (table 621) in order of priority. If the line is not available, the system designates the next line in the line pool which is checked for availability, steps 213, 211, 216. If there is no other line available in line pool PID A, the system attempts to find another available line pool, 206; if not, an all-pools-busy audible signal is outputted, 207, and the operation terminated, 204.

An alternative system embodiment enables the user to manually request the next line pool or next route. In such an arrangement, after step 213 the user would receive a pool-busy tone and in response thereto press the ESA button. The system would then return to step 206.

Assuming there is an available line in line pool PID A, the system seizes the line or facility in step 217. In step 217, the system seizes the line and proceeds in step 218 to dial the route character digits, 640, for pool PID A. The digits transmitted in step 218 prefix or optionally may be substituted for some digits of the called party dialing signal. In step 219, the system dials the called party dialing signal or number from its dial register. These steps, 218 and 219, occur during the time period t4-t6-t7 of 520 of FIG. 5. This dialing process actually occurs once the system places the call in the suspend state 220. The suspend state indicates that the CO facility is not connected to the network and will not be until all dialing has been completed.

While in the described embodiment all the user-dialed digits contained in the dial register, step 219, are outputted by the control unit following the route characters of step 218, one or more of the user-dialed digits may be deleted and not outputted during step 219 or optionally could be substituted for using the route character digits of step 218. This capability relieves the user of having to remember special dialing rules required for certain calling situations.

During the suspend state 220, the system dialing process begins in step 401 when the system removes a digit from route PID A queue 640 of route table 611 and the called number register 501. In step 402, the system determines whether the digit is a rotary digit requiring outpulsing, 403, or a touch-tone digit requiring generation of the appropriate tones, 404. In step 405 the system checks if all of the route characterizing and called party number digits have been dialed. If all digits have not been dialed, another digit is removed in step 401 and the process continues until the dialing queue is empty. If all the digits have been dialed, the system checks if the call is in the suspend state 406. If not in the suspend state 406, the dialing process is ended in step 409. If the call is in the suspend state, the system is informed that dialing is completed in step 407. At this time (t8 of 530 of FIG. 5), the system establishes a network connection between the calling party terminal and the selected line or facility (i.e., line 1 of line pool 622). As noted, prior to time t8 of 530 of FIG. 5, the calling party did not hear system dialing 520 of FIG. 5 but rather heard system acknowledgement signals 512. After a route is selected, the system places the call in a suspend state in step 220 (time t4 of FIG. 5).

Returning to FIG. 2, during the suspend state, step 220, the system is waiting for all the user's digits to be transmitted to the CO. Once all digits have been transmitted, the user is network connected (t8) to the CO line. At time t8 of FIG. 5, the user hears the normal CO call progress tones (515). Once the CO reaches the called party, either a ringing or busy tone 515 is returned to the calling party, at t9 of FIG. 5. The user determines if the called party is busy in step 221. If the tone is a ringing tone, the called party is not busy and either will answer if present (steps 222, 223) or not answer if not present (steps 222, 204). If the called party does not answer, the ringing continues until the calling party hangs up, thereby terminating the connection and ending the procedure 204. If the called party answers, the call is established in step 223 at time t15 of FIG. 5. Thereafter, either party can terminate the connection in the normal manner. Assuming a busy tone is received by the user 224 from the CO, the user may choose to hang-up 204 or press the ESA button to place the call on an alternate route 225 (i.e., the next preferred line pool).

If the user wants to send the call over the next preferred line pool, he or she can press the ESA button, step 225, causing the system to choose or select the next preferred line pool in step 206. That is, the most preferred line pool PID A may be a wide area telephone service (WATS) line pool where all lines have WATS service. The next preferred line pool may be a foreign exchange (FX) line pool and the next preferred line pool may be perhaps a plain old telephone service (POTS) over a specified common carrier.

If the user decides for cost or other reasons that he or she doesn't want to make the call on other than a WATS line, the ESA button is not pressed. The system then ends the procedure, step 204, after the user hangs up or disconnects or after a predetermined delay. Moreover, the system administrator may have determined that only WATS lines can be used by this calling station and hence only the WATS line pool is listed as a valid line pool for this station in table 607.

An important aspect of the present invention is the decoding by the digit analyzer, FIG. 3, of user-inputted digits to select a predetermined automated route selection (ARS) table of FIG. 6. Before describing the digit analyzer operation of FIG. 3, the ARS table of FIG. 6 will be described.

The ARS tables are divided into different groups. One type of route tables 611–613 are each accessible from different groups of NPA codes (i.e., 601, 602 and 603). Thus, for example, when a calling party dials any call using area code NPA1–NPA6, the system would detect that the area code is one code of NPA group 601 and would select route table 611 for use in establishing that call. Route table 611 includes a predetermined list of identified line pools (PID A–PID C). Moreover, there may be a predetermined priority or ordering of these line pools in route table 611. Moreover, it is contemplated that this line pool prioritizing may be based on calling costs and that the prioritizing may change depending on the time of day or day of the week. Some typical line pools may include wide area WATS, interstate WATS, intrastate WATS, distant FX, local FX and/or POTS. Additionally, different line pools may be grouped according to common carrier company.

Each line pool includes an identification code (e.g., PID A) and route characteristics which may include a common carrier access code, account number, and other information needed to establish the required connection and for proper billing of a call. Each line pool (PID A, PID B and PID C) has a group of lines (i.e., 621, 622, 623, respectively) associated therewith.

If the dialed area code is not NPA1–NPA11 and hence does not fall within one of the NPA groups 601–603, the system checks if the area code is a proper area code. A proper area code always has a zero or one as the middle digit, as illustrated by default toll table 604. Obviously, for all long-distance calls, the digit one must precede the area code. If a proper area code has been dialed by the user, then the system selects default toll table 604 and route table 614. Route table 614 includes a list of line pools 630, 631 and 632 which are to be utilized with calls to all other area codes except for NPA1–NPA11.

A default local table 605 is used for all calls where the area code is not preceded by a one or for area codes which have a middle digit that is neither a zero nor one. For such calls the route table 615 is used to list the line pools 633–635 to be utilized therewith.

Special NPA codes (area codes) such as 800, 900—inward WATS, 411—information, 611—repair, 911—emergency, or the O—operator are handled via table 606. Table 606 selects route table 616 which has a pool of lines 636 for use with such calls.

With joint reference to FIG. 3 and FIG. 6, the digit analyzer operation according to the present invention is described. In the following description, the first digit dialed by a user may be a zero, indicating a call to an operator; or one, indicating a long-distance call; or any other digit, indicating a local CO exchange call.

Once the user has dialed the digits associated with called party, the system determines, step 301, if the call is a new call. This is determined by checking whether the calling station has just gone off-hook. Assuming a new call has been dialed, the system call variables are initialized, step 302, in a well-known manner.

In step 303, the system determines if the first dialed digit is a one. If so, it sets a default toll call flag, 304, indicating a toll call is being made by the user. With the toll call flag set, the system returns to step 301 to obtain the next three digits (area code) dialed by the user to check against NPA tables 601–603 and default toll table 604 looking for an NPA match. If the first digit is not a one, it sets a default local call flag, 305, indicating a local call.

In step 306, the system checks if the first dialed digit is a zero. If not, it checks, 307, all of the ARS tables 601–606 looking for a first digit match. If a first-digit match exists with any of the ARS tables, control returns to step 301 to obtain subsequent user-inputted digits. If there is no first-digit match, the system defines the call as a local call, step 308, and sets the local call flag.

In step 309, the system checks if a pool identification (PID) code is available in the associated route table, i.e., default local table 605. If no PID identifier is available, a denial tone is outputted to the caller in step 320 and control returns to the terminate call step 204 of FIG. 2. This indicates to the user that his or her call is being denied by the system. Otherwise, the PID code is returned in step 311 to step 206 of FIG. 2.

Returning to step 306, if the first digit is a zero, the system defines the call as a special call, step 310, and sets a special call flag. Following step 310, the system checks the associated table (i.e., special route table 616) for a PID code. If no PID code is available, a denial tone is outputted to the caller in step 320 and control returns to step 204 of FIG. 2.

Returning to step 301, the second user-dialed digit is obtained from the dial register. In step 312, the system checks if the digit is the first digit of a scan sequence (i.e., area code or CO exchange code). Note, if the toll flag is set, the second user-dialed digit is either the first digit of the called area code or the first digit of a toll CO exchange call. The system would then store the digit in the associated call record in step 313 and control returns to step 301.

If the toll flag is set, the third user-dialed digit is the second digit of the area code. If it was the third digit, then in step 315 the digit is checked to determine if it is a zero or a one. If the digit is zero or one, the digit is stored, step 313, in the call related records. If the digit is not a zero or one, the local flag is set, 316, and the digit is stored, 313.

If the digit was not the second scan digit, it must be the third digit and in step 317, 318 the system checks all ARS tables (601–606) looking for a three-digit NPA number which matches the three-digit scan code entry. If a match is found, the PID code of the route table is located in step 309 and returned to step 206 of FIG. 2. If no match is found, default call parameters, step 319, are returned via steps 309, 311 to step 206 or steps 309, 320 to step 204 of FIG. 2.

Although the present invention has been described using code tables (601-603) having only NPA or NNX codes, an alternative embodiment of the techniques taught by the present invention could be expanded to incorporate code tables using both NPA and NNX codes. That is, while only three-digit patterns (NPA or NNX code) are used to determine the call route, step 317, it could be expanded to use six digits (NPA and NNX codes) or more to determine the call route. Alternatively, the system can be designed to match one- or two-digit patterns.

What has been described is merely illustrative of one embodiment of the principles of the present invention. Other methods, sequences or circuits can be used by those skilled in the art to implement the present invention without departing from the spirit and scope of the present invention.

What is claimed is:

1. A communication system comprising
   a common control unit connected to a plurality of communication lines arranged in a plurality of line groups and connected via a communication loop to a station set which is assigned to use two or more of said plurality of line groups, said common control unit including
   means responsive to called party dialing digits generated by said station set for selecting an individual one of said two or more of said plurality of line groups assigned to said station set as a function of said called party dialing digits and for selecting a line from the identified line group over which to place a call.

2. The communication system of claim 1 wherein said selecting means selects a non-busy line in said selected line group for said call.

3. The communication system of claim 1 wherein
   said selecting means designates a line in said selected line group for said call and
   said selected line group is busy and in response thereto said selecting means designates another line group for said call.

4. The communication system of claim 1 wherein said selecting means includes
   means for determining when a line is in use and
   means for choosing another line group when all lines of said selected line group are in use.

5. A communication system comprising
   a common control unit connected to a plurality of communication lines arranged in a plurality of line groups and connected via a communication loop to a station set which is assigned to use two or more of said plurality of line groups, said common control unit including
   means responsive to a called party dialing signal received from said station set for selecting a line from one of said two or more of said plurality of line groups assigned to said station set over which to place a call,
   said station set including means for generating said called party dialing signal and
   said selecting means including means for prefixing a predetermined digit to said called party dialing signal outputted over a line selected for said call.

6. The communication system of claim 1 wherein said selecting means includes
   means for deleting one or more digits of the called party dialing digits.

7. A communication system comprising
   a common control unit connected to a plurality of communication lines arranged in a plurality of line groups and connected via a communication loop to a station set which is assigned to use two or more of said plurality of line groups, said common control unit including
   means responsive to a called party dialing signal received from said station set for selecting a line from one of said two or more of said plurality of line groups assigned to said station set over which to place a call,
   said station set including means for generating said called party dialing signal and
   said selecting means including means for prefixing a substitute digit for said one or more digits of the called party dialing signal deleted by said deleting means.

8. A communication system comprising
   a common control unit connected to a plurality of communication lines arranged in a plurality of line groups and connected via a communication loop to a station set which is assigned to use two or more of said plurality of line groups, said common control unit including
   means responsive to a called party dialing signal received from said station set for selecting a line from one of said two or more of said plurality of line groups assigned to said station set over which to place a call,
   said station set including means for generating said called party dialing signal and
   said selecting means using NPA digits of said called party dialing signal to determine said selected line group for long distance calls.

9. A communication system comprising
   a common control unit connected to a plurality of communication lines arranged in a plurality of line groups and connected via a communication loop to a station set which is assigned to use two or more of said plurality of line groups, said common control unit including
   means responsive to a called party dialing signal received from said station set for selecting a line from one of said two or more of said plurality of line groups assigned to said station set over which to place a call,
   said station set including means for generating said called party dialing signal and
   said selecting means using NNX digits of said called party dialing signal to determine said selected line group for local calls.

10. A communication system comprising
    a common control unit connected to a plurality of communication lines arranged in a plurality of line groups and connected via a communication loop to a station set which is assigned to use two or more of said plurality of line groups, said common control unit including
    means responsive to a called party dialing signal received from said station set for selecting a line from one of said two or more of said plurality of line groups assigned to said station set over which to place a call,
    said station set including means for generating said called party dialing signal and
    said common control unit further including
    table means for indicating which calling parties can gain access to which line groups and
    means for checking said table using said called party dialing signal to determine if the calling party has permission to use a selected line group.

11. A communication system comprising
    a common control unit connected to a plurality of communication lines arranged in a plurality of line groups and connected via a communication loop to a station set which is assigned to use two or more of said plurality of line groups, said common control unit including
    means responsive to a called party dialing signal received from said station set for selecting a line from one of said two or more of said plurality of line groups assigned to said station set over which to place a call, said station set including means for generating said called party dialing signal and said station set connecting over two or more communication loops to said common control unit, including an intercom loop and an external loop, and said station set further including an external system access button for selecting said external loop and wherein said selecting means is responsive to the operation of said external system access button at and said called party dialing signal from said station set.

12. A communication system comprising a common control unit connected to a plurality of communication lines arranged in a plurality of line groups and connected via a communication loop to a station set which is assigned to use two or more of said plurality of line groups, said common control unit including means responsive to a called party dialing signal received from said station set for selecting a line from one of said two or more of said plurality of line groups assigned to said station set over which to place a call, said station set including means for generating said called party dialing signal and said selecting means recognizing predetermined sequences of NPA and NNX digits in said called party dialing signal to select a line for said call.

13. A communication system comprising a common control unit connected to a plurality of communication lines arranged in a plurality of line groups and connected via a communication loop to a station set which is assigned to use two or more of said plurality of line groups, said common control unit including means responsive to a called party dialing signal received from said station set for selecting a line from one of said two or more of said plurality of line groups assigned to said station set over which to place a call, said station set including means for generating said called party dialing signal and said common control unit including means for sending an audible tone to a station set in response to each user-dialed digit of the called party dialing signal received from said station set.

14. A communication system comprising a common control unit connected to a plurality of communication lines arranged in a plurality of line groups and connected via a communication loop to a station set which is assigned to use two or more of said plurality of line groups, said common control unit including means responsive to a called party dialing signal received from said station set for selecting a line from one of said two or more of said plurality of line groups assigned to said station set over which to place a call, said station set including means for generating said called party dialing signal and said common control unit including means for sending an audible tone to a station set in response to the operation of a repertory button depression at said station set.

15. A method of operating a communication system comprising a common control unit connected to a plurality of communication lines arranged in a plurality of line groups and connected via a communication loop to a station set which is assigned to use two or more of said plurality of line groups, said method including the steps of receiving called party dialing digits generated by said station set and selecting in response thereto a line from one of said two or more of said plurality of line groups assigned to said station set over which to place a call.

* * * * *